United States Patent
Bennett et al.

[11] 3,901,585
[45] Aug. 26, 1975

[54] ZOOM LENS ASSEMBLY

[75] Inventors: Harold F. Bennett, Pasadena; Wai-Min Liu, Arleta, both of Calif.

[73] Assignee: Xerox Corporation, Stamford, Conn.

[22] Filed: Oct. 23, 1973

[21] Appl. No.: 408,777

[52] U.S. Cl. .................................................. 350/184
[51] Int. Cl.² .......................................... G02B 15/00
[58] Field of Search ............................. 350/184, 186

[56] References Cited
UNITED STATES PATENTS

| | | | |
|---|---|---|---|
| 3,558,225 | 1/1971 | Kuchhoff | 350/184 |
| 3,609,005 | 9/1971 | Nakamura | 350/184 |

*Primary Examiner*—Ronald L. Wibert
*Assistant Examiner*—Conrad Clark
*Attorney, Agent, or Firm*—James J. Ralabate; Terry J. Anderson; Irving Keschner

[57] ABSTRACT

A zoom lens assembly for projecting images from an object plane to the image plane at magnifications from approximately 17 times to approximately 29 times and operating in the wavelength range from 0.38 to 0.54 microns. The zoom lens assembly comprises four members, including a front fixed member, two cam controlled moving members, and a rear fixed member. A diaphragm is mounted within the rear moving member and is controlled by a third cam to maintain a constant f/number aperture at the long conjugate. In a preferred embodiment, the cams which control the movable members are designed so that equal angular rotations of the cam sleeve into which the cam slots are cut changes the magnification by equal amounts.

5 Claims, 7 Drawing Figures

| GROUP | LENS | RADIUS | THICKNESS | SPACING | $N_d$ | $v_d$ |
|---|---|---|---|---|---|---|
| 20 | A | $R_1 = \infty$<br>$R_2 = -9.1187$ | $t_1 = .225$ | $S_1 = 34.70$<br>$S_2 = 0.022$ | 1.63854 | 55.5 |
|  | B | $R_3 = 3.9984$<br>$R_4 = 2.0436$ | $t_2 = .496$ | $S_3 = \begin{cases} 3.027 \text{ at } 17X \\ 3.419 \text{ at } 23.4X \\ 3.498 \text{ at } 29X \end{cases}$ | 1.62041 | 60.3 |
| 22 | C | $R_5 = 1.1048$<br>$R_6 = 2.6098$ | $t_3 = .251$ | $S_4 = .009$ | 1.72151 | 29.25 |
|  | D | $R_7 = 3.0308$ | $t_4 = .376$ |  | 1.69680 | 56.2 |
|  | E | $R_8 = -1.5515$<br>$R_9 = 0.7337$ | $t_5 = .092$ | $S_5 = .306$ | 1.58215 | 42.1 |
|  | F | $R_{10} = -.8420$<br>$R_{11} = 6.3730$ | $t_6 = .103$ | $S_6 = \begin{cases} 0.320 \text{ at } 17X \\ 0.681 \text{ at } 23.4X \\ 1.013 \text{ at } 29X \end{cases}$ | 1.50847 | 61.2 |
| 24 | G | $R_{12} = .9127$<br>$R_{13} = .8808$<br>(Diaphragm) | $t_7 = .310$ | $S_7 = .131$<br>$S_8 = .080$ | 1.74000 | 28.20 |
|  | H | $R_{14} = 5.5059$<br>$R_{15} = -2.4201$ | $t_8 = .089$ | $S_9 = .016$ | 1.58784 | 68.3 |
|  | I | $R_{16} = 2.2135$ | $t_9 = .183$ |  | 1.48749 | 70.4 |
|  | J | $R_{17} = -.7108$<br>$R_{18} = -4.9886$ | $t_{10} = .429$ | $S_{10} = .355$ | 1.68893 | 31.18 |
|  | K | $R_{19} = -205.6$ | $t_{11} = .310$ |  | 1.62096 | 35.90 |
|  | L | $R_{20} = -.8232$<br>$R_{21} = -1.6761$ | $t_{12} = .148$ | $S_{11} = \begin{cases} 2.411 \text{ at } 17X \\ 1.678 \text{ at } 23.4X \\ 1.277 \text{ at } 29X \end{cases}$ | 1.67270 | 32.21 |
| 26 | M | $R_{22} = 2.6378$<br>$R_{23} = 12.0100$ | $t_{13} = .622$ | $S_{12} = .537$ | 1.68852 | 30.62 |

F/# - F/100 at long conjugate; zoom magnification range = 17X to 29X - all dimensions in inches.

*FIG. 2*

| GROUP | LENS | RADIUS | THICKNESS | SPACING | $N_d$ | $v_d$ |
|---|---|---|---|---|---|---|
| 20 | A | $R_1=2138.$<br>$R_2=-9.1329$ | $t_1=.225$ | $S_1=34.71$<br><br>$S_2=.022$ | 1.65018 | 48.48 |
|  | B | $R_3=3.9903$<br>$R_4=2.0406$ | $t_2=.496$ | $S_3=\begin{cases}3.045\\3.381\\3.493\end{cases}$ | 1.63077 | 53.20 |
| 22 | C | $R_5=1.1053$<br>$R_6=2.6149$ | $t_3=.211$ | $S_4=.074$ | 1.74744 | 23.46 |
|  | D | $R_7=3.0501$ | $t_4=.360$ |  | 1.70930 | 49.56 |
|  | E | $R_8=-1.5597$<br>$R_9=0.7253$ | $t_5=.083$ | $S_5=.300$ | 1.59642 | 35.11 |
|  | F | $R_{10}=-.8475$<br>$R_{11}=9.4148$ | $t_6=.095$ | $S_6=\begin{cases}.310\\.603\\1.005\end{cases}$ | 1.51681 | 54.39 |
| 24 | G | $R_{12}=.9152$<br>$R_{13}=.8845$<br>(Diaphragm) | $t_7=.310$ | $S_7=.133$<br>$S_8=.080$ | 1.76764 | 22.53 |
|  | H | $R_{14}=5.5031$<br>$R_{15}=-2.4238$ | $t_8=.089$ | $S_9=.016$ | 1.59646 | 61.03 |
|  | I<br>J | $R_{16}=2.2159$<br>$R_{17}=-.7118$<br>$R_{18}=-4.9894$ | $t_9=.183$<br>$t_{10}=.430$ | $S_{10}=.356$ | 1.49439<br>1.71208 | 63.46<br>25.18 |
|  | K<br>L | $R_{19}=-217.3$<br>$R_{20}=-.8178$<br>$R_{21}=-1.6747$ | $t_{11}=.310$<br>$t_{12}=.148$ | $S_{11}=\begin{cases}2.426\\1.797\\1.282\end{cases}$ | 1.63900<br>1.69455 | 29.07<br>26.11 |
| 26 | M | $R_{22}=2.6348$<br>$R_{23}=10.4956$ | $t_{13}=.623$ | $S_{12}=.524$ | 1.71212 | 24.64 |

F/# – F/100 at long conjugate; zoom magnification range = 17X to 29X – all dimensions in inches.

FIG. 3

| GROUP | LENS | RADIUS | THICKNESS | SPACING | $N_d$ | $v_d$ |
|---|---|---|---|---|---|---|
| 20 | A | $R_1=-43.590$<br>$R_2=-7.7744$ | $t_1=.223$ | $S_1=35.890$<br><br>$S_2=.021$ | 1.638541 | 55.42 |
|  | B | $R_3=3.5297$<br>$R_4=2.0163$ | $t_2=.342$ | $S_3=\begin{cases}2.493 \text{ at } 17X\\2.980 \text{ at } 23.44X\\3.142 \text{ at } 29X\end{cases}$ | 1.620900 | 60.31 |
| 22 | C | $R_5=.9265$<br>$R_6=2.0712$ | $t_3=.240$ | $S_4=.114$ | 1.717360 | 29.51 |
|  | D | $R_7=2.6880$ | $t_4=.164$ |  | 1.696800 | 56.1800 |
|  | E | $R_8=-1.4440$<br>$R_9=.6362$ | $t_5=.082$ | $S_5=.334$ | 1.582151 | 42.08 |
|  | F | $R_{10}=-.6968$<br>$R_{11}=13.5695$ | $t_6=.090$ | $S_6=\begin{cases}.229 \text{ at } 17X\\.507 \text{ at } 23.44X\\.758 \text{ at } 29X\end{cases}$ | 1.500129 | 61.44 |
| 24 | G | $R_{12}=.9068$<br>$R_{13}=.8971$<br>(Diaphragm) | $t_7=.289$ | $S_7=0.07014$<br>$S_8=0.06000$ | 1.740002 | 28.20 |
|  | H | $R_{14}=-105.643$<br>$R_{15}=-1.8307$ | $t_8=.084$ | $S_9=.016$ | 1.58784 | 68.25 |
|  | I | $R_{16}=2.1335$ | $t_9=.146$ |  | 1.487490 | 70.41 |
|  | J | $R_{17}=-.6513$<br>$R_{18}=-4.6035$ | $t_{10}=.198$ | $S_{10}=.259$ | 1.688521 | 30.62 |
|  | K | $R_{19}=11.8805$ | $t_{11}=.290$ |  | 1.620962 | 35.90 |
|  | L | $R_{20}=-.6818$<br>$R_{21}=-1.4662$ | $t_{12}=.302$ | $S_{11}=\begin{cases}2.644 \text{ at } 17X\\1.879 \text{ at } 23.44X\\1.466 \text{ at } 29X\end{cases}$ | 1.688932 | 31.18 |
| 26 | M | $R_{22}=1.9523$<br>$R_{23}=5.5923$ | $t_{13}=.493$ | $S_{12}=.5290$ | 1.688521 | 30.62 |

F/# – F/100 AT LONG CONJUGATE; ZOOM MAGNIFICATION RANGE = 17X TO 29X – ALL DIMENSIONS IN INCHES.

*FIG. 5*

ZOOM LENS ASSEMBLY

BACKGROUND OF THE INVENTION

One of the more recent technological innovations has been the utilization of microfilm to store the information generated by computers. The computer provides a visual output, for example, on a screen of a cathode ray tube, which output is then photographed onto microfilm. To achieve full utilization of information stored on microfilm, it is desirable to print such variable information onto forms having preprinted information thereon. The preprinted forms may comprise business operations letterhead, distinctive logo, or other similar type of non-varying information on a continuous strip or web. It is necessary, therefore, to transfer or print the variable prerecorded information from the microfilm onto the web so that the variable information is accurately registered with the preprinted information with a minimum of distortion. The availability of commercial machines for printing the variable information on microfilm in registration with preprinted information has been extremely limited.

Recently it has been proposed that a xerographic copying machine be employed to directly utilize microfilm having variable data photographed thereon, the microfilm having the variable data functioning as the original document for copying purposes. A copy medium, preferably a web of paper, would have preprinted, non-variable information provided thereon.

In the type of system described it is desirable to have a system for projecting the images from the microfilm at various desired magnification ratios with a minimum of distortion onto the preprinted web. In the prior art xerographic systems, copying of microfilm has customarily been accomplished by the use of fixed focal length lenses. To change the magnification, it was necessary to change the track length (the overall optical distance from the object to image) and then refocus the lens system. Alternatively, the prior art provided "add" lenses which were added to the original lens system to extend the useful range of magnification. Magnification would be changed in the former, by moving the film gate or the image receptor, i.e., xerographic plate or drum, with their associated mechanisms, or, in the latter situation, by inserting add lens and then refocusing the system. The complexities and inaccuracies with these techniques are quite obvious.

The convenience of a mechanically conpensated zoom lens system which avoids the deficiences noted hereinabove is disclosed, for example, in U.S. Pat. Nos. 3,360,325 and 3,640,605 which describe prior art systems for solving this problem. Although adequate for the purposes envisioned in the aforementioned patents, the disclosed systems do not meet the necessary resolution and distortion requirements in the required spectral band and magnification ranges as in the projection system described hereinabove.

SUMMARY OF THE PRESENT INVENTION

The present invention provides a zoom lens assembly particularly adapted for projecting images from the object plane to the image plane at magnifications from approximately 17 times to approximately 29 times and operating in the wavelength range from 0.38 to 0.54 microns.

In particular the zoom lens assembly of the present invention is made up of four members, including a front fixed member, two cam controlled moving members, and a rear fixed member. A diaphragm is mounted within the rear moving member and is controlled by a third cam to maintain a constant $f$/number aperture at the long conjugate. The magnification is changed by rotating the cam sleeve into which two cam slots are cut. In a preferred embodiment, the cams which control the movable members are designed so that equal angular rotations change the magnification by equal amounts.

An object of the present invention is to provide a zoom lens assembly which has high resolution and low distortion in a predetermined spectral band and magnification range.

It is still a further object of the present invention to provide a zoom lens assembly made up of four members including a fixed front member, two cam controlled moving members, and a rear fixed member. The cams are designed so that equal angular rotations change the magnification by equal amounts. A diaphragm mounted within the rear moving member is controlled by a third cam to maintain a constant $f$/number aperture at the long conjugate.

It is still a further object of the present invention to provide a novel zoom lens assembly which provides a sharp image and provides a high resolution power at best focus at the image plane.

DESCRIPTION OF THE DRAWINGS

For a better understanding of the invention as well as other objects and further features thereof, reference is made to the following description which is to be read in conjunction with the following drawings wherein:

FIG. 2 is a chart of a first compilation of constructional data for the embodiment shown in FIG. 1;

FIG. 3 is a chart of a second compilation of constructional data for the embodiment shown in FIG. 1;

FIG. 5 is a chart of a compilation of constructional data for the embodiment shown in FIG. 4;

DESCRIPTION OF THE PREFERRED EMBODIMENTS

Figure 1:
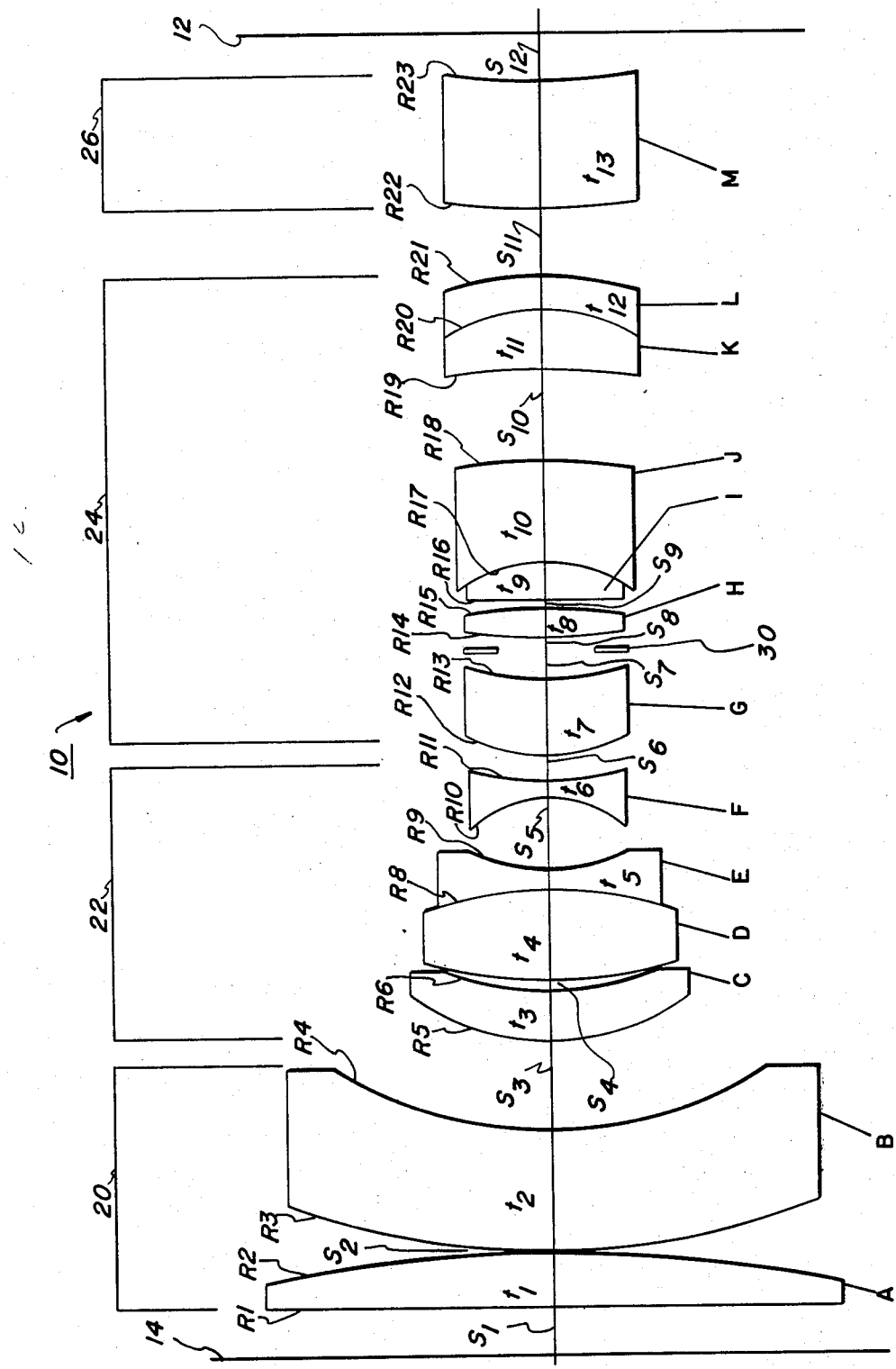
FIG. 1 is an optical diagram of one embodiment of the present invention.

Referring to FIG. 1, the mechanical zoom lens of the present invention is designated by reference numeral 10, the object plane (film plane) of the lens system is designated by the reference numeral 12, and the image plane of the lens system is designated by the reference numeral 14. For the purposes of this description the "front" of an optical system, member or element is that part thereof nearest image plane 14.

The lens system 10 is made up of four members, the front member being identified by the reference numeral 20 and being fixed, the second member being identified by reference numeral 22 and being movable, the third member being designated by reference numeral 24 and being movable, and the rear member being identified by reference numeral 26 and being fixed.

Member 20 is made up of a double convex lens A which is utilized to adjust the image to focus at the image plane 14. Spaced from positive lens A by an air gap is a negative meniscus element B convex to the front. Movable member 22 comprises an air spaced triplet comprising elements C, D, and E. The motion of moving member 22 is computed to hold the distance from member 20 to the optimum focus adjacent image plane 14 at a constant value as the positive zooming member 24 is moved. Element C is a positive meniscus lens element convex to the front separated from double convex lens element D by an air gap. Element E is a double concave lens element which is cemented to the rear surface of lens element D. Element F, the last element of movable member 22, is a double concave lens element with a weakly curved (almost plane) rear surface and is spaced from element E. Elements C, D, E and F essentially form a negative compensating member which compensates for variation in lateral color throughout the zooming range. Movable member 24 is the positive zooming member and comprises a negative meniscus element G convex to the front which is utilized to correct for aberrations such as coma and spherical aberration. Lens element H is spaced from element G by an air gap with a variable iris diaphragm 30 interposed therebetween. Element H, providing approximately one-half of the positive power of member 24, is a double convex lens element comprising a glass (or other optical material) with a low dispersion effect. Spaced from element H is a doublet comprising positive double convex lens element I of low negative dispersion and meniscus lens element J concave to the front having a high dispersion, lens J being cemented to lens I in a known manner. The doublet substantially corrects for spherical aberration and axial color. In order to improve secondary color aberration, a final doublet spaced from doublet I and J and comprising elements K and L is provided. Positive Element K is a meniscus lens element with a substantially flat front surface which is cemented to negative meniscus lens L concave to the front, each lens comprising a glass (or other optical material) selected for favorable partial dispersions in the pertinent spectral range.

The fourth member of the assembly, essentially a field flattener, comprises thick positive meniscus lens M having a substantially flat rear surface.

The front focusing lens A refocuses the image (focused by the movable zoom members 22 and 24 at a plane between the front surface of lens A and image plane 14) to the object plane 14. The rear focusing member M similarly moves the object focus (focused by the zoom members at a plane to the rear of the object plane 12) to the object plane 12.

The two charts set forth in FIGS. 2 and 3 are examples of constructional data for two embodiments of the zoom lens assembly shown in FIG. 1. It should be noted that radius R of the front surface of element A is shown to be substantially flat and is intended to illustrate both the FIGS. 2 and 3 embodiments of $R_1$.

Figure 4:
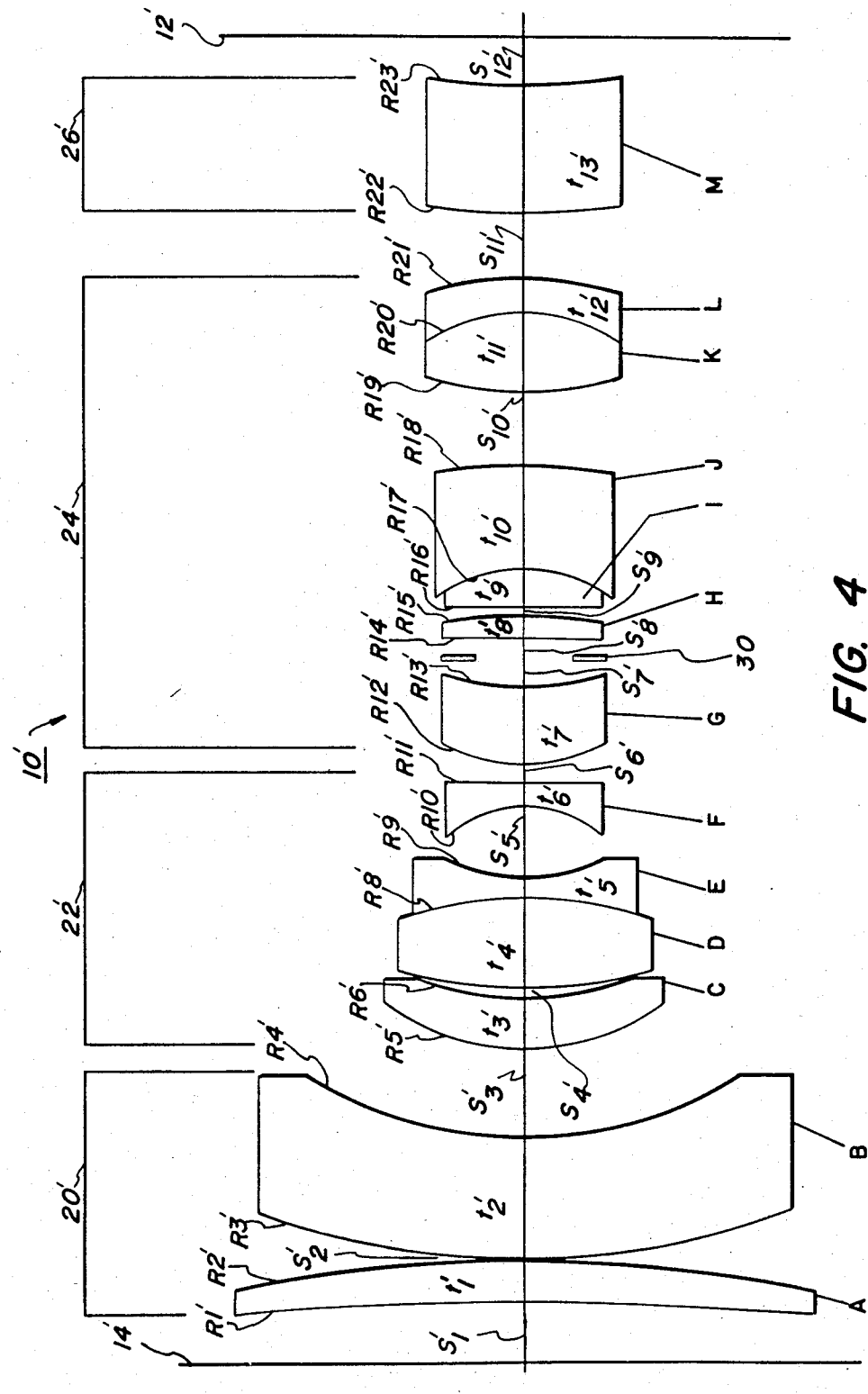
FIG. 4 is an optical diagram of a second embodiment of the present invention.

Referring now to FIG. 4, a second embodiment of the zoom lens assembly is illustrated. In particular, the zoom lens is designated by reference numeral 10', the object plane (film plane) of the lens system is designated by the reference numeral 12', and the image plane of the lens system is designated by the reference numeral 14'.

The lens system 10' is made up of four members, in a manner identical to the system shown in FIG. 1, the front member being identified by the reference numeral 20' and being fixed, the second member being identified by reference numeral 22' and being movable, the third member being designated by reference numeral 24' and being movable, and the rear member being identified by reference numeral 26' and being fixed.

Member 20' is made up of a positive meniscus element A concave to the front which is utilized to adjust the image to focus at the image plane 14'. Spaced from positive lens A by an air gap is a negative meniscus element B convex to the front. Movable member 22' comprises an air spaced triplet comprising elements C, D, and E. The motion of moving member 22' is computed to hold the distance from member 20' to the optimum focus adjacent image plane 14' at a constant value as the positive zooming member 24' is moved. Element C comprises a positive meniscus lens element concave to the front and element D comprises a double convex lens element separated from C by an air gap. Element E is a double concave lens element which is cemented to the rear surface of lens element D. Element F, the last element of movable member 22', is a double concave lens element, with a weakly curved (almost plane) rear surface and is spaced from element E. Elements C, D, E and F essentially form a negative compensating member which compensates for variation in lateral color throughout the zooming range. Movable member 24' is the positive zooming member and comprises a negative meniscus element G convex to the front which is utilized to correct for aberrations such as coma and spherical aberration. Lens element H is spaced from element G by an air gap with a variable iris diaphragm 30' interposed therebetween. Element H, providing approximately one-half of the positive power of member 24', is a positive meniscus lens concave to the front comprising a glass (or other optical material) with a low dispersion effect. Spaced from element H is a doublet comprising double convex lens element I of low dispersion and negative meniscus lens element J concave to the front having a high dispersion, lens J being cemented to lens I in a known manner. The doublet substantially corrects for spherical aberration and axial color. In order to improve secondary color aberration, a final doublet spaced from doublet I and J and comprising elements K and L is provided. Element K is a double convex lens element which is cemented to negative meniscus lens L concave to the front, each lens comprising a glass (or other optical material) selected for favorable partial dispensions in the pertinent spectral range.

The fourth member of the assembly, essentially a field flattener, comprises thick positive meniscus lens element M having a substantially flat rear surface.

The front focusing lens A refocuses the image (focused by the movable zoom members 22' and 24' at a plane between the front surface of lens A and image plane 14') to the object plane 14'. The rear focusing member similarly moves the object focus (focused by the zoom members at a plane to the rear of the object plane 12') to the object plane 12'.

The chart set forth in FIG. 5 is the constructional data for the zoom lens assembly shown in FIG. 4.

Figure 6:
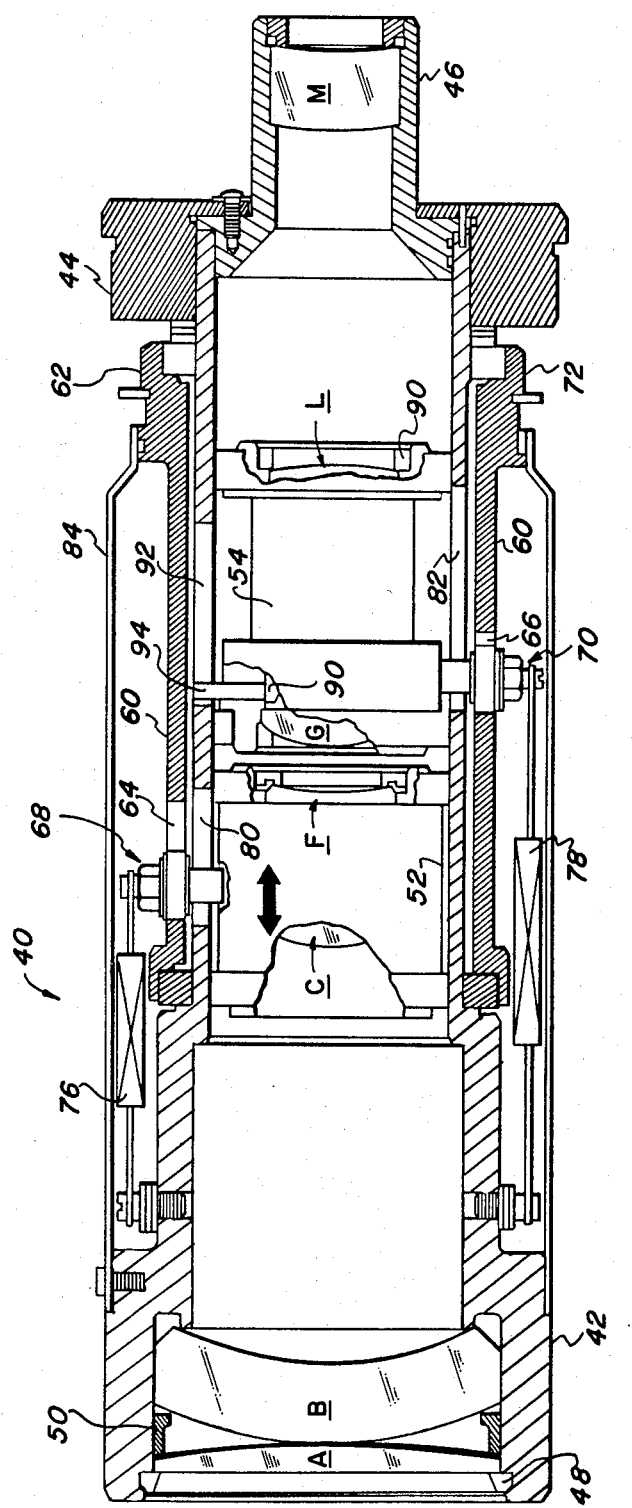
FIG. 6 is a longitudinal sectional view of the adjustably mounted lens assembly shown in FIG. 1.

Referring now to FIG. 6, there is shown a diagrammatic longitudinal sectional view of a lens assembly mount, the lens assembly of FIG. 1 being mounted therein (the lens assembly of FIG. 4 may also be similarly mounted). The adjustable mount 40 includes housing 42, and a mounting collar 44. The mounting collar 44 mounts the housing to an external apparatus, such as the film projection system described hereinabove.

Lenses A and B of the first fixed member are fixedly mounted within housing 42 by retainer member 48 and spacer 50 in a conventional manner as shown.

The second movable group of lenses C-F are mounted within lens assembly 52 in a known manner and separated from the first fixed group by a predetermined distance depending upon the nominal magnification. The lens elements G-L, comprising the third movable member, are mounted within lens assembly 54 and spaced from lens assembly 52 by a similarly predetermined distance. The fourth member, comprising lens M, is fixedly mounted within housing portion 46. A cam sleeve assembly 60, having a gear tooth portion 62 at one end thereof, is so mounted adjacent housing 42 such that it overlaps at least a portion of lens assemblies 52 and 54. The cam sleeve 60 includes slot portions 64 and 66 into which are interposed cam followers 68 and 70, respectively. The cam followers, which may comprise a nut, bolt and washer assembly as shown, are fixedly mounted to the respective lens assemblies through the slots 80 and 82. Cam follower 68 is biased by spring member 76 against a finished surface of cam slot 64, as shown, and thereby maintains lens assembly 52 at its nominal axial position. Spring member 78 biases cam follower 70 against one surface of cam slot 66 and maintains lens assembly 54 in its nominal axial position. Slots 80 and 82 are provided to allow for axial movement (and to prevent rotation) of lens assemblies 52 and 54. A cover 84 may be included to prevent dust or other materials from contaminating the optical elements.

An iris diaphragm 90 is mounted between lenses G and H and moves axially with the lens assembly 54. Pin 94 extends through slot 92 and is coupled to diaphragm 90 to control the aperture size. Iris diaphragms of the type described are commercially available from, for example, Ilex Corporation, Rochester, N.Y.

As will be described hereinafter in more detail, the cam slots 64 and 66 are so designed that equal angular rotation of cam sleeve 60 will produce a corresponding equal change in magnification. For systems which will utilize the magnification ratio as a control parameter, providing a magnification which is linearly related to the rotation of the cam sleeve 60 provides obvious advantages, such as simplicity in the control mechanism.

To zoom or change magnification of the assembly, a timing belt (not shown) is provided to coact with gear teeth 62. The timing belt, when energized, causes cam sleeve 60 to rotate. The cam followers 68 and 70, projecting through slots 64 and 66, are forced to traverse the slots in a direction whereby the lens assemblies affixed thereto are driven in the axial direction from left to right, as viewed from FIG. 6, as the lower pin structure of the cam followers are forced to traverse slots 80 and 82.

The movement of lens assembly 54 causes pin 94 to traverse slot 92 in a manner whereby diaphragm 90 is adjusted in a manner such that a constant $f$/number is maintained at the long conjugate.

The details of the lens mount 40 have not been described since it is believed to be within the skill of those involved in the areas of optical technology. For example, the patent to Harris et al., U.S. Pat. No. 3,038,378, describes a typical adjustable lens mount. The present invention is, in fact, directed to particular features of the lens mount.

Figure 7:
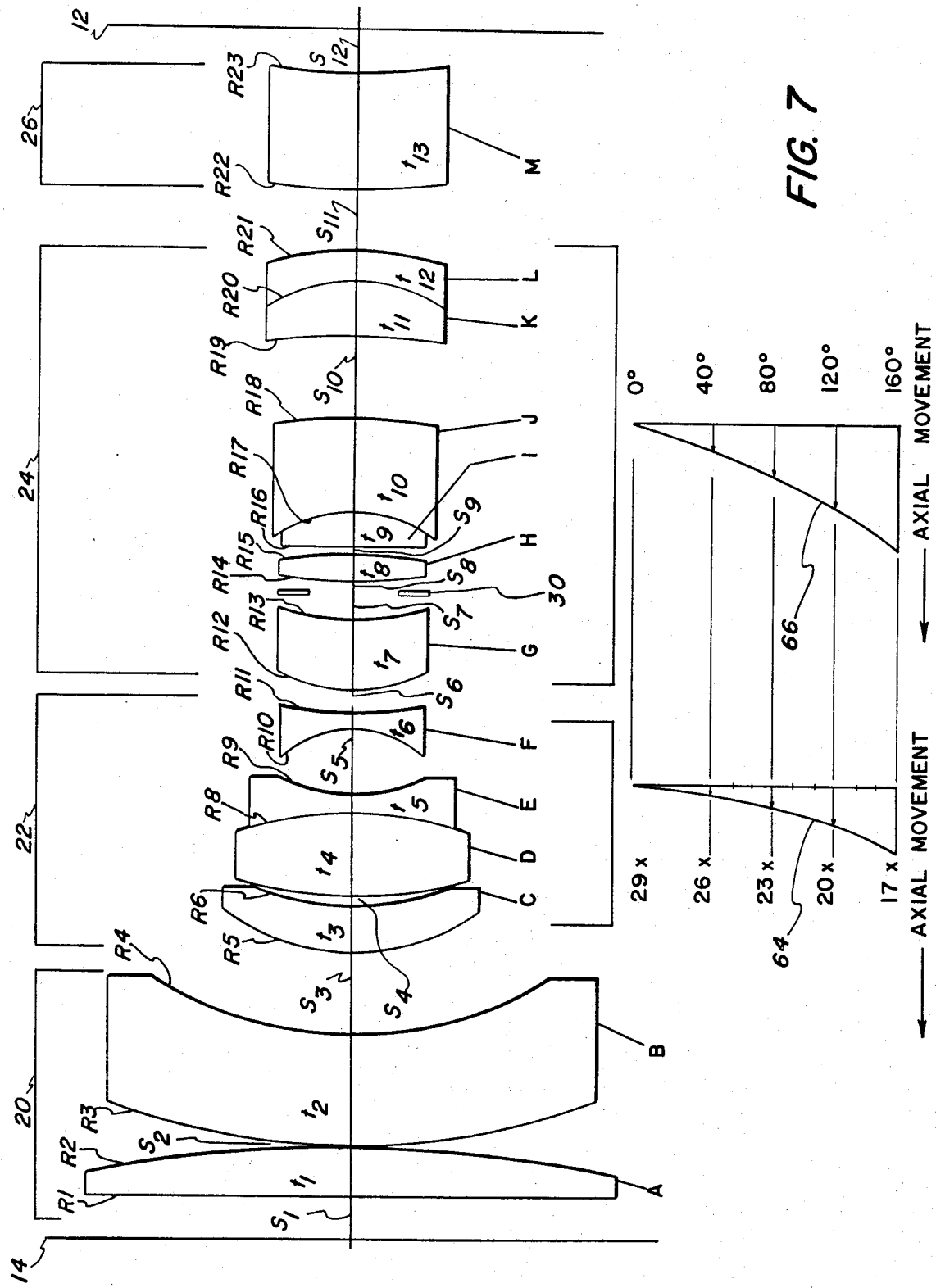
FIG. 7 is a layout of the cam surfaces utilized to position the adjustable lens elements.

In particular, cam surfaces 64 and 66, shown in a layout form in FIG. 7, have been designed so that equal angular rotation of cam sleeve 60 will cause an equal change in magnification. For example, at the nominal, or initial setting, magnification is set at 29X. A 40° increment of cam sleeve rotation will change the magnification to 26X (decrease of three magnification levels). The second 40° angular displacement (total of 80°) will decrease the magnification by an equal step to 23X, and so on.

The cam slots may be designed by setting up a computer run on a curve-fitting program with the magnification as the independent variable.

The data for the lenses shown in FIGS. 1 and 2 for calculating the cam slot layout is as follows:

| NOMINAL MAGNIFICATION | S3 | S6 | S11 |
|---|---|---|---|
| 17.04564 | 3.0318510 | .3229110 | 2.4346213 |
| 18.63505 | 3.1721664 | .4103794 | 2.2068380 |
| 20.37274 | 3.2882232 | .5076907 | 1.9934700 |
| 22.27249 | 3.3796228 | .6158862 | 1.7938748 |
| 24.35046 | 3.4456984 | .7363030 | 1.6073825 |
| 26.62320 | 3.4857438 | .8703342 | 1.4333058 |
| 29.11120 | 3.4985565 | 1.0198787 | 1.2709486 |

This data was verified to ensure that the best focus remained at the same film plane, any necessary shifting being accomplished by changing S3 and S6 equally in opposite directions. The nominal magnification was computed for a test object of 7 inches diameter at the long conjugate. This was adopted as a standardized specification since it cuts the effective distortion in half at 29X, where the distortion is a maximum, and maintains the distortion to about 0.1 percent or less at all magnifications.

The cam shapes were, in the preferred embodiment, computed and fabricated so that equal angular rotations of the cam sleeve would produce equal increments in the magnification. In particular, the following polynomial was set up:

$$Si = A + BX + CX^2 + DX^3 + \ldots$$

where $Si = S3$, $S6$ and $S11$ and where $X =$ magnification. The numerical values for the constants A, B, C, D . . . were derived by setting up simultaneous linear equations (linear as far as A, B, C, D . . . are concerned) as follows:

1. $A + 17.05B + 290.6C + 4953D + \ldots = 3.032 \ldots$

2. $A + 18.63B + 347.0C + 6436D + \ldots = 3.172 \ldots$

. . . .

7. $A + 29.11B + 852.6C + 24689D + \ldots = 3.498 \ldots$

These equations are written out to the required accuracy and solved by elmination, matrix methods or by fitting quadratic, cubic and successively higher degree equations until the errors of fit become sufficiently small.

Once the three equations are established, Si is easily computed for successive numerical values of X. For example, for $X = 29.00$, $X = 28.95$, $X = 28.90 \ldots X = 17.00$ would give approximately 241 points on the cams, and if it is decided to rotate the cams 160°, these points would be at every 0° 40′. It will be noted that S3 and S11 determine the motions of the moving members and that S6 is computed to confirm whether the sum of S3, S6 and S11 remains constant.

It should be noted that the procedure described hereinabove may be utilized to calculate cam slot layouts for other optical lens configurations in addition to that shown in FIGS. 1 and 2.

The cam slot 92 controlling the iris setting is similarly designed such that a particular angular rotation of the cam sleeve 60 will cause pin 94 to move along slot 92 such that the iris setting is adjusted to provide a constant f/number at the long conjugate.

It is convenient to obtain diaphragms which open linearly with respect to the movement of a control lever. The movement is then a function of S11:

Diaphragm setting $= K [A+B-S11+C(S11)^2]$ where $K$ is the constant of the diaphragm (or the diaphragm function if not linear), A, B and C are polynomial coefficients as set forth previously and S11 is the rear variable space. The diaphragm setting is then computed in degrees and the cam slot 92 is cut in accordance therewith.

Referring to FIG. 7, the shapes of the cam slots (developed) are shown graphically at 64 and 66. The 29.00X position shown at the top of the graph is taken as the fiducial position and conveniently as the zero position for the cam slot cutting tool. As the cam sleeve is rotated, the cutting tool is moved in accordance with the computed values set forth hereinabove and along the path shown in FIG. 7 to provide the desired cam slot. For example, for cam slot 66, at 22.27X magnification the cam sleeve has rotated 89° 44′ and S11 has increased from 1.2643 to 1.7939 so that the cutting tool must be controlled to be such that it has moved 0.5296 inches (1.7939−1.2643) from the fiducial position.

The diameter of the iris opening necessary to provide the necessary f/number at the long conjugate, computed by standard optical techniques, is adjusted as lens assembly 54 is positioned within slot 78. The angular setting of iris pin 94 to provide a desired iris opening is supplied by the manufacturer of the iris diaphragm. The length and position of cam slot 92 is therefore calculated as set forth hereinabove to provide the necessary angular movement to pin 94, thereby controlling aperture size.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A zoom lens assembly consisting essentially of an axially fixed front member, an axially movable second member, an axially movable third member, and an axially fixed rear fourth member, the first fixed member comprising, from the front to the rear, a double convex element and a negative meniscus element convex to the front, the axially movable second member comprising, from the front to the rear, a positive meniscus element convex to the front, a doublet comprising a double convex element, the rear surface of which is affixed to a first double concave element, and a second double concave element, said third movable member comprising, from the front to the rear a negative meniscus element convex to the front, a first double convex element; a first doublet comprising a second double convex element the rear surface of which is affixed to a first negative meniscus element concave to the front and a second doublet comprising a positive meniscus element, the rear surface of which is affixed to a second negative meniscus element concave to the front, the fourth fixed member comprising a positive meniscus element.

2. A zoom lens assembly consisting essentially of an axially fixed front first member, an axially movable second member, an axially movable third member, and an axially fixed rear fourth member, the first fixed member comprising, from the front to the rear, a positive meniscus element concave to the front and a negative meniscus element convex to the front, the axially movable second member comprising, from the front to the rear, a positive meniscus element concave to the front, a double convex element, the rear surface of which is affixed to a first double concave element, and a second double concave element, said third movable member comprising, from the front to the rear, a negative meniscus element convex to the front, a positive meniscus element concave to the front, a first doublet comprising a double convex element, the rear surface of which is affixed to a negative meniscus element concave to the front and a second doublet comprising a double convex element, the rear surface of which is affixed to a negative meniscus element concave to the front, and the fourth fixed member comprising a positive meniscus element.

3. A zoom lens assembly made substantially according to the following specifications:

| GROUP | LENS | RADIUS | THICKNESS |
|---|---|---|---|
|  |  | $R_1 = \infty$ |  |
| 20 | A |  | $t_1 = .225$ |
|  |  | $R_2 = -9.1187$ |  |
|  |  | $R_3 = 3.9984$ |  |
|  | B |  | $t_2 = .496$ |
|  |  | $R_4 = 2.0436$ |  |
|  |  | $R_5 = 1.1048$ |  |
|  | C |  | $t_3 = .251$ |
| 22 |  | $R_6 = 2.6098$ |  |
|  | D | $R_7 = 3.0308$ | $t_4 = .376$ |
|  |  | $R_8 = -1.5515$ |  |
|  | E |  | $t_5 = .092$ |
|  |  | $R_9 = 0.7337$ |  |
|  |  | $R_{10} = -.8420$ |  |
|  | F |  | $t_6 = .103$ |
|  |  | $R_{11} = 6.3730$ |  |
|  |  | $R_{12} = .9127$ |  |
|  | G |  | $t_7 = .310$ |
| 24 |  | $R_{13} = .8808$ |  |
|  |  | (Diaphragm) |  |
|  |  | $R_{14} = 5.5059$ |  |
|  | H |  | $t_8 = .089$ |
|  |  | $R_{15} = -2.4201$ |  |
|  | I | $R_{16} = 2.2135$ | $t_9 = .183$ |
|  | J | $R_{17} = -.7108$ |  |
|  |  |  | $t_{10} = .429$ |
|  |  | $R_{18} = -4.9886$ |  |
|  | K | $R_{19} = 205.6$ | $t_{11} = .310$ |
|  | L | $R_{20} = -.8232$ |  |

-Continued

| GROUP | LENS | RADIUS | THICKNESS |
|---|---|---|---|
| 26 | M | $R_{21}=-1.6761$<br>$R_{22}=2.6378$ | $t_{12}=.148$ |
|  |  | $R_{23}=12.0100$ | $t_{13}=.622$ |

| GROUP | SPACING | $N_d$ | $V_d$ |
|---|---|---|---|
| 20 | $S_1=34.70$ | 1.63854 | 55.5 |
|  | $S_2=0.022$ | 1.62041 | 60.3 |
| 22 | $S_3=\begin{cases}3.027 \text{ at } 17\times\\3.419 \text{ at } 23.4\times\\3.498 \text{ at } 29\times\end{cases}$ |  |  |
|  |  | 1.72151 | 29.25 |
|  | $S_4=.009$ | 1.69680 | 56.2 |
|  |  | 1.58215 | 42.1 |
|  | $S_5=.306$ | 1.50847 | 61.2 |
| 24 | $S_6=\begin{cases}0.320 \text{ at } 17\times\\0.681 \text{ at } 23.4\times\\1.013 \text{ at } 29\times\end{cases}$ |  |  |
|  |  | 1.74000 | 28.20 |
|  | $S_7=.131$ |  |  |
|  | $S_8=.080$ | 1.58784 | 68.3 |
|  | $S_9=.016$ | 1.48749 | 70.4 |
|  |  | 1.68893 | 31.18 |
|  | $S_{10}=.355$ | 1.62096 | 35.90 |
|  |  | 1.67270 | 32.21 |
| 26 | $S_{11}=\begin{cases}2.411 \text{ at } 17\times\\1.678 \text{ at } 23.4\times\\1.277 \text{ at } 29\times\end{cases}$ |  |  |
|  |  | 1.68852 | 30.62 |
|  | $S_{12}=.537$ |  |  |

F/# - F/100 at long conjugate; zoom magnification range = 17× to 29× - all dimensions in inches.

4. A zoom lens assembly made substantially according to the following specifications:

| GROUP | LENS | RADIUS | THICKNESS |
|---|---|---|---|
| 20 | A | $R_1=2138.$<br>$R_2=-9.1329$ | $t_1=.225$ |
|  | B | $R_3=3.9903$<br>$R_4=2.0406$ | $t_2=.496$ |
|  | C | $R_5=1.1053$ | $t_3=.211$ |
| 22 | D | $R_6=2.6119$<br>$R_7=3.0501$ | $t_4=.360$ |
|  | E | $R_8=-1.5597$ | $t_5=.083$ |
|  | F | $R_9=0.7253$<br>$R_{10}=.8475$ | $t_6=0.95$ |
|  | G | $R_{11}=9.4148$<br>$R_{12}=.9152$ | $t_7=.310$ |
| 24 | | $R_{13}=.8845$<br>(Diaphragm) |  |
|  | H | $R_{14}=5.5031$ | $t_8=.089$ |
|  | I | $R_{15}=-2.4238$<br>$R_{16}=2.2159$ |  |
|  | J | $R_{17}=-.7118$ | $t_9=.183$ |
|  |  |  | $t_{10}=.430$ |
|  | K | $R_{18}=-4.9894$<br>$R_{19}=-217.3$ | $t_{11}=.310$ |
|  | L | $R_{20}=-.8178$ |  |
|  |  |  | $t_{12}=.148$ |
| 26 | M | $R_{21}=-1.6747$<br>$R_{22}=2.6348$ |  |
|  |  | $R_{23}=10.4956$ | $t_{13}=.623$ |

-Continued

| GROUP | LENS | RADIUS | THICKNESS |
|---|---|---|---|

| GROUP | SPACING | $N_d$ | $V_d$ |
|---|---|---|---|
| 20 | $S_1=34.71$ | 1.65018 | 48.48 |
|  | $S_2=.022$ | 1.63077 | 53.20 |
|  | $S_3=\begin{cases}3.045\\3.381\\3.493\end{cases}$ |  |  |
|  |  | 1.74744 | 23.46 |
|  | $S_4=.074$ | 1.70930 | 49.56 |
| 22 |  | 1.59642 | 35.11 |
|  | $S_5=.300$ | 1.51681 | 54.39 |
|  | $S_6=\begin{cases}.310\\.603\\1.005\end{cases}$ |  |  |
|  |  | 1.76764 | 22.53 |
|  | $S_7=.133$ |  |  |
| 24 | $S_8=.080$ |  |  |
|  | $S_9=.016$ | 1.59646 | 61.03 |
|  |  | 1.49439 | 63.46 |
|  |  | 1.71208 | 25.18 |
|  | $S_{10}=.356$ | 1.63900 | 29.07 |
|  |  | 1.69455 | 26.11 |
|  | $S_{11}=\begin{cases}2.426\\1.797\\1.282\end{cases}$ |  |  |
| 26 |  | 1.71212 | 24.64 |
|  | $S_{12}=.524$ |  |  |

F/# - F/100 at long conjugate; zoom magnification range = 17× to 29× - all dimensions in inches.

5. A zoom lens assembly made substantially according to the following specifications:

| GROUP | LENS | RADIUS | THICKNESS |
|---|---|---|---|
| 20 | A | $R_1=-43.590$ | $t_1=.223$ |
|  | B | $R_2=-7.7744$<br>$R_3=3.5297$ | $t_2=.342$ |
| 22 | C | $R_4=2.0163$<br>$R_5=.9265$ | $t_3=.240$ |
|  | D | $R_6=2.0712$<br>$R_7=2.6880$ | $t_4=.164$ |
|  | E | $R_8=-1.4440$ | $t_5=.082$ |
|  | F | $R_9=.6362$<br>$R_{10}=.6968$ | $t_6=.090$ |
| 24 | G | $R_{11}=13.5695$<br>$R_{12}=.9068$ | $t_7=.289$ |
|  |  | $R_{13}=.8971$<br>(Diaphragm) |  |
|  | H | $R_{14}=-105.643$ | $t_8=.084$ |
|  | I | $R_{15}=-1.8307$<br>$R_{16}=2.1335$ | $t_9=.146$ |
|  | J | $R_{17}=-.6513$ | $t_{10}=.198$ |
|  | K | $R_{18}=-4.6035$<br>$R_{19}=11.8805$ | $t_{11}=.290$ |
|  | L | $R_{20}=-.6818$ | $t_{12}=.302$ |
| 26 | M | $R_{21}=-1.1662$<br>$R_{22}=1.9523$ | $t_{13}=.493$ |
|  |  | $R_{23}=5.5923$ |  |

| GROUP | SPACING | $N_d$ | $V_d$ |
|---|---|---|---|
| 20 | $S_1=35.890$ | 1.638541 | 55.42 |
|  | $S_2=.021$ | 1.620900 | 60.31 |

-Continued

| GROUP | LENS | RADIUS | | THICKNESS |
|---|---|---|---|---|
| 22 | $S_3 = \begin{cases} 2.493 \text{ at } 17\times \\ 2.980 \text{ at } 23.44\times \\ 3.142 \text{ at } 29\times \end{cases}$ | | 1.717360 | 29.51 |
| | $S_4 = .114$ | | | |
| | | | 1.696800 | 56.18 |
| | | | 1.582151 | 42.08 |
| | $S_5 = .334$ | | | |
| | | | 1.500129 | 61.44 |
| | $S_6 = \begin{cases} .229 \text{ at } 17\times \\ .507 \text{ at } 23.44\times \\ .758 \text{ at } 29\times \end{cases}$ | | | |
| 24 | | | 1.740002 | 28.20 |
| | $S_7 = 0.07014$ | | | |
| | $S_8 = 0.06000$ | | | |
| | $S_9 = .016$ | | 1.58784 | 68.25 |
| | | | 1.487490 | 70.41 |
| | | | 1.688521 | 30.62 |
| | $S_{10} = .259$ | | | |
| | | | 1.620962 | 35.90 |
| | | | 1.688932 | 31.18 |
| | $S_{11} = \begin{cases} 2.644 \text{ at } 17\times \\ 1.879 \text{ at } 23.44\times \\ 1.466 \text{ at } 29\times \end{cases}$ | | | |
| 26 | | | 1.688521 | 30.62 |
| | $S_{12} = .5290.$ | | | |

* * * * *

UNITED STATES PATENT AND TRADEMARK OFFICE
CERTIFICATE OF CORRECTION

PATENT NO. : 3,901,585
DATED : August 26, 1975
INVENTOR(S) : Harold F. Bennett et al It is certified that error appears in the above—identified patent and that said Letters Patent are hereby corrected as shown below:

Column 9, claim 4, between lines 45 and 50, "$R_6 = \phantom{-}2.6149$" should read -- $R_6 = 2.6149$ --. Between lines 50 and 55, "$R_{10} = -\phantom{.}.8475$" should read -- $R_{10} = -.8475$ --.

Column 10, claim 5, between lines 45 and 50, "$R_{10} = -\phantom{.}.6968$" should read -- $R_{10} = -.6968$ --. Between lines 60 and 65, "$R_{21} = -\phantom{1}1.4662$" should read -- $R_{21} = -1.4662$ --.

Signed and Sealed this

*twenty-third* Day of *December 1975*

[SEAL]

Attest:

RUTH C. MASON
*Attesting Officer*

C. MARSHALL DANN
*Commissioner of Patents and Trademarks*